US006975438B2

(12) United States Patent
Schilling et al.

(10) Patent No.: US 6,975,438 B2
(45) Date of Patent: Dec. 13, 2005

(54) OPTICALLY VARIABLE SURFACE PATTERN

(75) Inventors: Andreas Schilling, Hagendorn (CH); Wayne Robert Tompkin, Baden (CH); René Staub, Hagendorn (CH)

(73) Assignee: OVD Kinegram AG, Zug (CH)

( * ) Notice: Subject to any disclaimer, the term of this patent is extended or adjusted under 35 U.S.C. 154(b) by 107 days.

(21) Appl. No.: 10/480,909

(22) PCT Filed: Jun. 5, 2002

(86) PCT No.: PCT/EP02/06149

§ 371 (c)(1),
(2), (4) Date: Feb. 5, 2004

(87) PCT Pub. No.: WO03/000503

PCT Pub. Date: Jan. 3, 2003

(65) Prior Publication Data

US 2005/0068624 A1 Mar. 31, 2005

(30) Foreign Application Priority Data

Jun. 20, 2001 (DE) ................................ 101 29 939

(51) Int. Cl.[7] ................................................ G03H 1/00
(52) U.S. Cl. .......................................... 359/2; 283/902
(58) Field of Search ............................ 359/2, 567, 571, 359/572, 574; 83/85, 86; 428/29, 916

(56) References Cited

U.S. PATENT DOCUMENTS

| | | | | |
|---|---|---|---|---|
| 4,094,575 A | | 6/1978 | Kellie | 359/10 |
| 5,032,003 A | * | 7/1991 | Antes | 359/567 |
| 5,569,522 A | * | 10/1996 | Steininger et al. | 428/195.1 |
| 6,157,487 A | | 12/2000 | Staub et al. | 359/567 |
| 6,369,947 B1 | * | 4/2002 | Staub et al. | 359/574 |

FOREIGN PATENT DOCUMENTS

| | | |
|---|---|---|
| DE | 42 43 905 A1 | 6/1994 |
| DE | 44 04 128 A1 | 8/1994 |
| EP | 0 105 099 B1 | 4/1984 |
| EP | 0 201 323 B1 | 11/1986 |
| EP | 0 330 738 B1 | 9/1989 |
| EP | 0 375 833 B1 | 7/1990 |

* cited by examiner

*Primary Examiner*—Mark A. Robinson
*Assistant Examiner*—Alessandro Amari
(74) *Attorney, Agent, or Firm*—Hoffmann & Baron, LLP

(57) ABSTRACT

An optically variable surface pattern (1) contains relief structures (9.1; 9.2; 9.3) for producing at least two representations (2; 3; 4). The relief structures (9.1; 9.2; 9.3) have a period length (L) of at least five micrometers and are sawtooth-shaped. The relief structures (9.1; 9.2; 9.3) associated with different representations (2; 3; 4) have different angles of inclination (α;β;γ). The angles of inclination are so selected that the representations (2; 3; 4) can be perceived separately by a viewer on the one hand and on the other hand when producing a copy by means of a color photocopier they are all transferred onto the copy.

15 Claims, 3 Drawing Sheets

Fig. 4
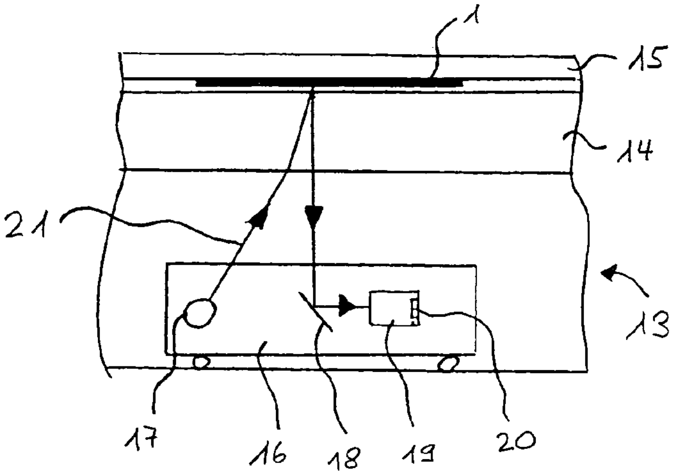
Fig. 5
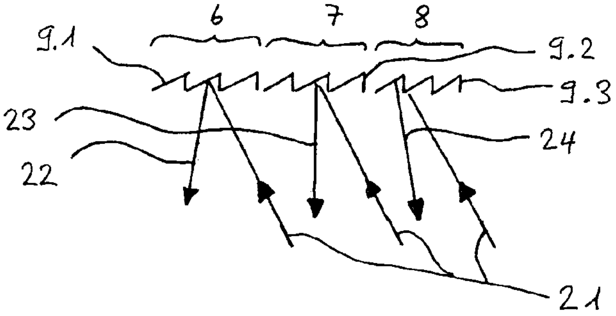
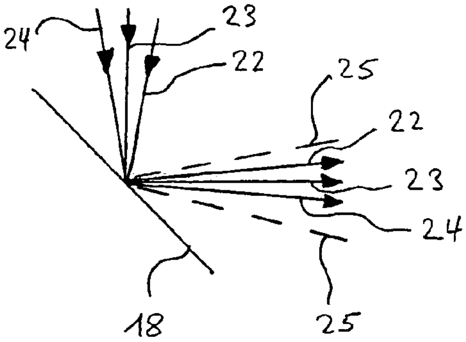
Fig. 6

OPTICALLY VARIABLE SURFACE PATTERN

This application claims priority based on an International Application filed under the Patent Cooperation Treaty, PCT/EP02/06149, filed on Jun. 5, 2002, and German Patent Application No. 101 29 939.7, filed on Jun. 20, 2001.

BACKGROUND OF THE INVENTION

The invention concerns an optically variable surface pattern of the kind set forth in the classifying portion of claim 1.

Such surface patterns contain structures, generally in the form of microscopically fine relief structures, which diffract impinging light. Those diffractive patterns are suitable for example as an authenticity and security feature for enhancing the level of safeguard against forgery. They are suitable in particular for protecting value-bearing papers or security bonds, banknotes, payment means, identity cards, passes, etc.

The function thereof as an authenticity feature is to give the recipient of the article provided therewith, for example a banknote, the feeling that the article is genuine and not a forgery. The function thereof as a security feature is to prevent unauthorized copying or at least to make it extremely difficult.

Surface patterns of that kind are known from many sources: reference is made here as representative examples to EP 0 105 099 B1, EP 0 330 738 B1 and EP 0 375 833 B1. They are distinguished by the brilliance of the patterns and the movement effect in the pattern, they are embedded in a thin laminate of plastic material and they are applied, for example glued in the form of a stamp onto documents such as banknotes, bonds, personal identity papers, passports, visas, identity cards and so forth. Materials which can be used for production of the security elements are summarized in EP 0 201 323 B1.

A pixel-oriented optically variable surface pattern is known from EP 0 375 833 B1. Such a surface pattern contains a predetermined number N of different images. The surface pattern is subdivided into pixels. Each pixel is subdivided into N subpixels, wherein associated with each of the N subpixels of a pixel is an image point from one of the N images. Each subpixel contains a diffraction structure in the form of a microscopically fine relief containing information about a color value, about a stage in the brightness value and about a viewing direction. There is only ever one single image that is represented to a person viewing the surface pattern, wherein the respective visible image can be altered by tilting or rotating the surface pattern or by altering the angle of view of the viewer.

A further optically variable surface pattern is known from U.S. Pat. No. 6,157,487. In that surface pattern the microscopically fine relief structures involve a comparatively small number of lines per millimeter so that impinging light is virtually achromatically diffracted.

Another known idea is that based on the differences in spectral sensitivity of the human eye and a color photocopier, which involves providing documents with a colored background and printing information on the background in another color, wherein the information and the background involve a contrast which is perceptible to the human eye but which cannot be reproduced by the color photocopiers.

SUMMARY OF THE INVENTION

The object of the present invention is to propose an optically variable surface pattern which has improved copying protection.

According to the invention the specified object is attained by the features of claim 1.

A surface pattern which has an optical diffraction effect includes at least two representations which are arranged in mutually nested relationship on the surface pattern. The representations include light-diffracting, reflecting structures which under ordinary lighting conditions diffract impinging light in different directions so that a viewer can only ever see one of the representations. By turning and/or tilting the surface pattern or by varying the angle of view, the viewer can make the one representation or the other into the visible representation. The invention is now based on the idea of making the differences in the diffraction directions so small that the representations can be perceived separately by the viewer from a typical distance of 30 cm on the one hand and that on the other hand in a copying operation by means of a color photocopier either all representations are copied so that produced on the copy is an image which corresponds to the superimposition of all representations, or none of the representations is copied.

Preferably symmetrical or asymmetrical sawtooth-shaped relief structures are used as the diffraction structures, the relief structures being of a relatively great period length in relation to the wavelength of visible light but involving different angles of inclination. The period length can be the same for the relief structures of all representations; it may however also be of different magnitudes. The period length L is typically 5 $\mu$m or even more. The greater the period length is, the correspondingly more the relief structure acts like an inclined mirror at which the impinging light is reflected and is scarcely diffracted. In other words, the relief structure increasingly achromatically diffracts the light and the diffraction angle is determined by the laws of reflection and diffraction and for perpendicularly incident light is at least double the angle of inclination.

The diffraction structures used may also be achromatic diffraction gratings with a period length L of more than 5 $\mu$m and a sine-like relief profile, for example a sinusoidal relief profile. The relief structures of the various representations differ in respect of the period length L and/or the structural depth of the relief profile so that the representations can be perceived separately by the observer.

The diffraction structures however may also be embodied in the form of a volume hologram.

The surface pattern according to the invention can therefore be characterized in that, upon illumination with light impinging perpendicularly onto the surface pattern, the various representations can be perceived separately by a human observer at different angles of view and that the difference in the angles of view of at least two of the representations is so small that a copy produced by means of a copier reproduces the at least two representations one over the other.

With a predetermined illumination direction the diffraction directions are dependent on the orientation of the surface pattern. So that, in a copying operation by means of a color photocopier, all representations are copied onto the copy independently of the orientation of the surface pattern, there can be, for each representation, a plurality of representations of the same content which are formed by grating structures which are linear but rotated relative to each other. Another solution involves using circular gratings as the gratings.

BRIEF DESCRIPTION OF THE DRAWINGS

Embodiments of the invention are described in greater detail hereinafter with reference to the drawing in which:

FIG. 4 shows a color photocopier,

FIGS. 5 and 6 show light conditions in the copying operation,

DESCRIPTION OF THE PREFERRED EMBODIMENTS

Figure 1:
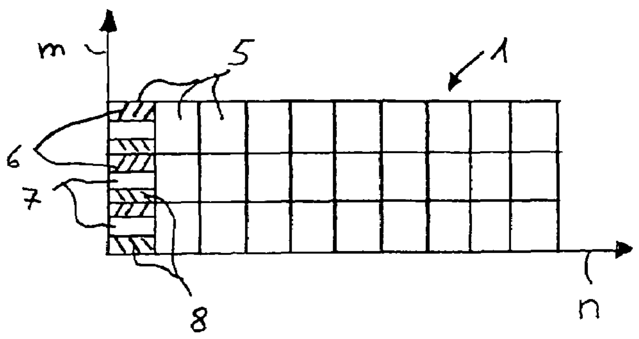
FIG. 1 is a plan view of the structure of a pixel-oriented surface pattern.
Figure 2:
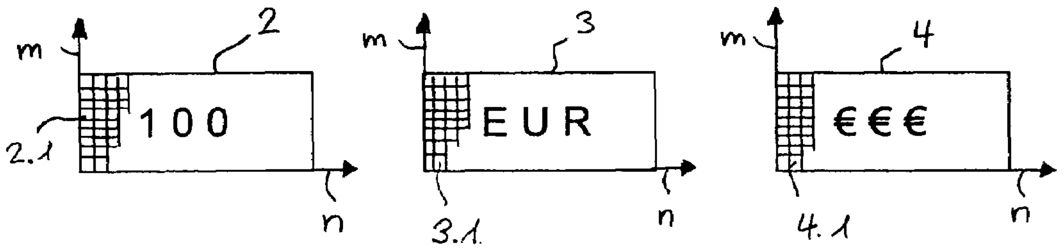
FIG. 2 shows graphic representations.

FIG. 1 is a plan view in respect of a first embodiment showing the structure of a pixel-oriented surface pattern 1 which for example contains k=3 image motifs which are perceptible separately by a human observer at different angles of view. The image motifs are identified hereinafter as graphic representations 2, 3 and 4 (FIG. 2). The surface pattern 1 is subdivided matrix-like into n*m pixels or fields 5. Each field 5 is subdivided into k=3 surface portions 6, 7 and 8. The totality of the surface portions 6 contains the first graphic representation 2, the totality of the surface portions 7 contains the second graphic representation 3 and the totality of the surface portions 8 contains the third graphic representation 4. The dimensions of a field 5 are typically less than 0.3 mm×0.3 mm so that the individual fields 5 cannot be resolved by the human eye at a viewing distance of 30 cm.

FIG. 2 shows the three representations 2, 3 and 4 which for example represent the groups of characters "100", "EUR" and "€€€". The characters are light on a dark background (this is reversed in the drawing). The representations 2, 3 and 4 are also subdivided matrix-like into n*m raster fields 2.1, 3.1 and 4.1 respectively which are either light or dark. For reasons relating to the drawing the raster fields 2.1, 3.1, 4.1 are much too large in comparison with the characters and in addition only some of the raster fields 2.1, 3.1, 4.1 are shown. A surface portion 6 (FIG. 1) is associated with each raster field 2.1 of the first representation 2. In the same manner a surface portion 7 (FIG. 1) is associated with each raster field 3.1 of the second representation 3 and a surface portion 8 (FIG. 1) is associated with each raster field 4.1 of the third representation 4.

Figure 3:
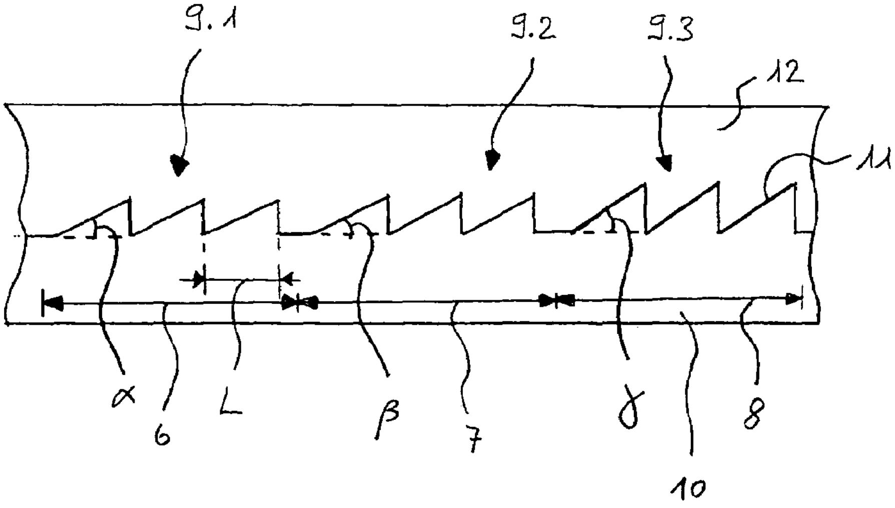
FIG. 3 shows a view in cross-section of the surface pattern.

If one of the raster fields 2.1 of the first representation 2 is dark the associated surface portion 6 contains a mirror or a cross grating with at least 3,000 lines per millimeter, whereby the impinging light is reflected, absorbed or scattered into high angles. If one of the raster fields 2.1 is light, the associated surface portion 6, as shown in FIG. 3, includes a sawtooth-shaped relief structure 9.1. The relief structure 9.1 involves a period length L which is comparatively large in comparison with the wavelength of visible light and which is typically 5 μm or more. Therefore, the first representation 2 (FIG. 2) appears when illumination is implemented with white light and if the viewer assumes his angle of view corresponding to the reflection conditions of geometrical optics, it appears as an image of light and dark points which are generally of the color of the reflection layer 11 used for covering the relief structure 9.1 and/or of the cover layer 12.

The other two representations 3 (FIG. 2) and 4 (FIG. 2) are implemented with a similar sawtooth-shaped relief structure 9.2 and 9.3 respectively as the relief structure 9.1 of the first representation 2. The angles of inclination α, β and γ of the sawtooth of the three relief structures 9.1, 9.2 and 9.3 respectively with respect to the plane of the surface pattern 1 are so selected that:

a) a viewer who views the surface pattern 1 from a typical distance of 30 cm sees in each case only one of the three representations 2, 3 or 4, and b) when copying is effected by means of a color photocopier either at least two or none at all of the representations 2, 3 and 4 are also copied.

The grooves of the various relief structures 9.1, 9.2 and 9.3 extend approximately parallel, that is to say the maximum difference in the angles that the grooves assume with respect to any axis in the plane of the surface pattern 1, the so-called azimuth angle, is to be less than about 10°, so that under the lighting conditions which prevail in the copying operation, either all three or none at all of the representations 2, 3 and 4 are transferred onto the copy. In addition the grooves preferably extend parallel to a side edge of the article to be protected with the surface pattern so that the grooves are oriented as parallel as possible with the scanner of a color photocopier.

The surface pattern 1 is advantageously in the form of a layer composite, as shown in cross-section in FIG. 3. The layer composite is formed by a first lacquer layer 10, a reflection layer 11 and a second lacquer layer, the cover layer 12. The lacquer layer 10 is advantageously an adhesive layer so that the layer composite can be glued directly onto a substrate. The term substrate is used to denote for example a value-bearing paper or bond, a banknote, an identity card, a credit card, a passport or quite generally an article to be protected. The cover layer 12 advantageously completely encloses the relief structures. In addition, in the visible region it preferably has an optical refractive index of at least 1.5 so that the geometrical profile height h affords an optically effective profile height which is as large as possible. The cover layer 12 further serves as a scratch-resistant protective layer. For the sake of simplicity of the description the influence of refraction at the interface between air (refractive index=1) and the cover layer 12 with a refractive index of around 1.5 is disregarded.

FIG. 3 shows in mutually juxtaposed relationship the sawtooth-shaped relief structures 9.1, 9.2 and 9.3 which are associated with the light pixels of the three representations 2, 3 and 4 in FIG. 2 and which are present in the corresponding surface portions 6, 7 and 8 respectively of the fields 5. When viewing from a distance of 30 cm and with a pupil diameter of 5 mm the human eye perceives the representations 2, 3 and 4 separately if the difference in the angle of inclination between each two adjacent representations is about 0.5°–5°. The angles of inclination are for example α=12.5°, β=15° and γ=17.5°. The value for the largest angle of inclination, that is to say in this case for the angle of inclination γ, should be at most 25° so that on the one hand the relief structures 9 do not become too deep and so that on the other hand all three representations 2, 3 and 4 are transferred onto the copy when producing a copy by means of a copier.

FIG. 4 diagrammatically shows the geometrical conditions when copying by means of a color photocopier 13. The color photocopier 13 has a glass panel 14 on which the document 15 to be copied, for example a banknote, rests, and a carriage 16 which is displaceable in the x direction and which includes a light source 17, a deflection mirror 18 and a detector 19 with photoelectric sensors 20. In the copying operation the light 21 emitted by the light source 17 is incident inclinedly at a given angle on the document 15 and thus inclinedly on the surface pattern 1 which is present on the document 15 and which has the variously inclined relief structures 9.1, 9.2 and 9.3 (FIG. 3). A part of the incident light is reflected back approximately perpendicularly with respect to the glass panel 14, impinges on the mirror 18 and in that way the image thereof is produced on the photoelectric sensors of the color photocopier 13.

The angles of inclination α, β and γ are so selected that, with the correct orientation on the glass panel 14 of the color photocopier 13, the relief structures 9.1, 9.2 and 9.3 reflect the light emitted from the light source 17 onto the deflection mirror 18. FIG. 5 shows that situation. Of each of the representations 2, 3 and 4, a respective associated surface portion 6, 7 and 8 respectively is illustrated on a very greatly enlarged scale, wherein a light point of the representation is associated with those surface portions. The light beam reflected at the relief structure 9.1 is identified by reference 22, the light beam reflected at the relief structure 9.2 is denoted by reference 23 and the light beam reflected at the relief structure 9.3 is denoted by reference 24. The light beams 22, 23 and 24 reflected at those three illustrated surface portions 6, 7 and 8 respectively, as shown in FIG. 6, impinge virtually in mutually juxtaposed relationship on the mirror 18 and are there deflected in the direction of the photoelectric sensors 20. Although the light beams 22, 23 and 24 impinge on the mirror 18 at various angles, the image thereof is produced on the photoelectric sensors 20 as the differences in the angles are sufficiently small. More specifically, in the case of a conventional color photocopier, angle differences of typically 30° are detected. The limits of the region detected by the color photocopier are shown by broken lines 25. In the present example with the angles of inclination α=12.5°, β=15° and γ=17.5° the maximum angle difference between the light beams 22, 23 and 24 is only 10°.

The mean angle of inclination at 15° is also adapted to the typical angle of 30° at which the light 21 emitted by the light source 17 in the color photocopier 13 impinges on the document to be copied. This means that then the light diffracted at the associated relief structure is diffracted approximately perpendicularly downwardly towards the deflection mirror 18.

So that the representations are perceived separately by a human viewer under ordinary lighting conditions and at a viewing distance of 30 cm, the surface of the document receiving the surface pattern 1 must involve a relatively smooth surface as otherwise the representations are smeared because of the roughness so that they are not separately visible. Therefore, larger angles of inclination of α=10°, β=15° and γ=20° or even α=5°, β=15° and γ=25° are provided for use with documents with a relatively rough surface as for example banknotes have. Even in this case all diffracted light beams 22, 23 and 24 still pass onto the photoelectric sensors 20 of the color photocopier 13. The difference between the largest and the smallest angles of inclination should be at most 20° so that all representations are copied in the copying operation.

In the copying operation therefore either all or none of the three representations is transferred onto the copy. The information stored in the representations of the surface pattern 1 therefore becomes illegible or entirely disappears.

In the preceding numerical examples the differences between successive angles of inclination, that is to say the difference β−α and the difference γ−β, were equal. However the differences between successive angles of inclination may also be of different magnitudes.

Figure 7:
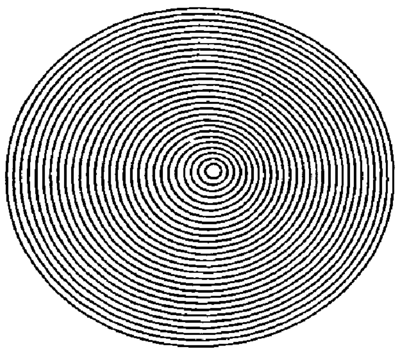
FIG. 7 shows a grating with circular grooves.

In order to minimize or even eliminate the dependency of the effect of the orientation of the surface pattern on the color photocopier, the relief structures 9.1, 9.2 and 9.3 are advantageously not linear gratings with straight grooves but gratings with grooves which are in the form of wavy lines, that is to say gratings with grooves with fluctuating curvature or gratings with circular grooves or with polygonal grooves approximating to a circle. A relief structure with circular grooves is shown in FIG. 7. The spacing between each two circular lines corresponds to the period length L.

Figure 8:
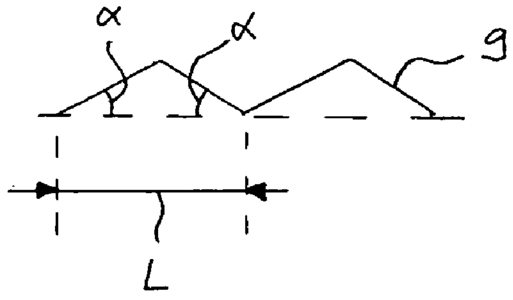
FIG. 8 shows a relief structure with a symmetrical profile shape.

Instead of the asymmetrical relief structures 9.1, 9.2, 9.3 it is also possible to use relief structures with a symmetrical profile shape, which reflect impinging light substantially not in a single direction but in two directions. Such an example is shown in FIG. 8. The Figure also shows the angle α which denotes the inclination of the relief structures 9 with respect to the horizontal.

Figure 9:
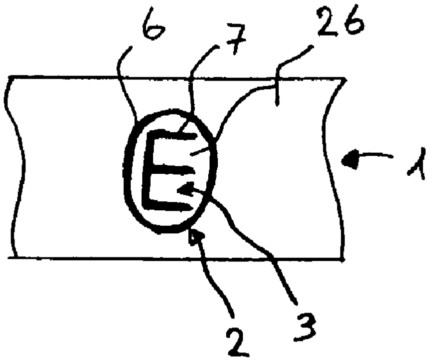
FIG. 9 shows a non-pixel-oriented surface pattern.

The implementation of the invention is not limited to pixel-oriented surface patterns. FIG. 9 shows a portion of an example of a non-pixel-orientated surface pattern with two representations 2 and 3 which do not overlap. The area occupied by the surface pattern 1 is subdivided into three surface portions 6, 7 and 26. The surface portion 26 serves as a common background for the two representations 2 and 3. The surface portion 6 contains sawtooth-shaped relief structures which have a first angle of inclination and which produce the light points in the first representation 2. The surface portion 7 contains sawtooth-shaped relief structures which have a second angle of inclination differing from the first angle and which produce the light points of the second representation 3. The surface portion 26 serves to produce a dark or inconspicuous background. It is for example in the form of a mirror or a cross grating with at least 3,000 lines per millimeter or it is transparent so that at that location the substrate on which the surface pattern is glued is visible.

The two representations 2 and 3 can thus be perceived separately by a human viewer with a predetermined lighting direction because they are visible at different angles of view. It will be noted that the angles of inclination of the sawtooth-shaped relief structures are selected to be so small that, in a copying operation by means of a photocopier, the image of both representations 2 and 3 is produced on the copy. The two representations 2 and 3 are therefore visible on the copy without the viewer having to change the angle of view or the lighting direction.

If the two representations partially overlap the invention can be embodied either in accordance with the first embodiment in the form of a pixel-oriented surface pattern or in accordance with the above embodiment in the form of a non-pixel-oriented surface pattern, in which case then the overlapping regions are associated either with the first or the second representation. The surface pattern can also be implemented in the form of a combination of the two embodiments, in which case the overlapping regions are designed as in the case of the pixel-oriented surface pattern.

What is claimed is:

1. An optically variable surface pattern comprising surface portions with light-diffracting, reflecting structures and reflective surface portions for producing two or more representations which with lighting with light impinging perpendicularly onto the surface pattern are perceptible separately by a human viewer at a viewing distance of 30 cm at different angles of view, wherein the surface portions contain achromatically light-diffracting, sawtooth-shaped relief structures with angles of inclination of the sawtooth with respect to the plane of the surface pattern, the relief structures associated with different representations have different angles of inclination and the value of the largest angle of inclination is at most 25° so that the difference in the angles of the light beams reflected at the relief structures from at least two of the representations is smaller than an angle difference detected by the photoelectric sensor of a photocopier of 30°, whereby a copy produced by means of a photocopier reproduces at least two representations one over the other.

2. A surface pattern as set forth in claim 1, wherein the light-diffracting, reflecting structures are microscopically fine relief structures, and have a period length of at least five micrometers.

3. A surface pattern as set forth in claim 2, wherein the relief structures have a symmetrical profile shape.

4. A surface pattern as set forth in claim 1, wherein the difference between the angles of inclination of two representations is at least 0.5°.

5. A surface pattern as set forth in claim 1, wherein the difference between the largest and the smallest angles of inclination is at most 20°.

6. A surface pattern as set forth in claim 1, wherein when there are three representations, the mean angle of inclination is of the value of 15°.

7. A surface pattern as set forth in claim 1, wherein the differences of successive angles of inclination are of equal magnitude.

8. A surface pattern as set forth in claim 1, wherein the grooves of the relief structures are wavy, circular or polygonal approximating a circle.

9. A surface pattern as set forth in claim 1, wherein the grooves of the relief structures are straight and the grooves of the various relief structures are approximately parallel.

10. A surface pattern as set forth in claim 1, wherein the reflective surface portions have cross grating with at least 3,000 lines per millimeter.

11. A surface pattern as set forth in claim 1, wherein the light-diffracting, reflecting structures are embodied in the form of a volume hologram.

12. An optically variable surface pattern comprising surface portions with light-diffracting, reflecting structures and reflective surface portions for producing two or more representations which with lighting with light impinging perpendicularly onto the surface pattern are perceptible separately by a human viewer at a viewing distance of 30 cm at different angles of view, wherein the surface portions contain achromatically light-diffracting, sine-like relief structures with a period length of at least 5 μm, wherein the relief structures associated with the various representations differ in the period length and/or the structure depth so that the difference in the angles of the light beams reflected at the relief structures from at least two of the representations is smaller than an angle difference detected by the photoelectric sensor of a photocopier of 30°, whereby a copy produced by means of a photocopier reproduces at least two representations one over the other.

13. A surface pattern as set forth in claim 12, wherein the grooves of the relief structures are wavy, circular or polygonal approximating a circle.

14. A surface pattern as set forth in claim 12, wherein the grooves of the relief structures are straight and the grooves of the various relief structures are approximately parallel.

15. A surface pattern as set forth in claim 12, wherein the reflective surface portions have cross grating with at least 3,000 lines per millimeter.

* * * * *